(12) United States Patent
Chen

(10) Patent No.: US 10,337,175 B2
(45) Date of Patent: *Jul. 2, 2019

(54) WATER GENERATION SYSTEM FOR DESERTS

(71) Applicant: Jui-Wen Chen, New Taipei (TW)

(72) Inventor: Jui-Wen Chen, New Taipei (TW)

( * ) Notice: Subject to any disclaimer, the term of this patent is extended or adjusted under 35 U.S.C. 154(b) by 303 days.

This patent is subject to a terminal disclaimer.

(21) Appl. No.: 15/396,824

(22) Filed: Jan. 3, 2017

(65) Prior Publication Data

US 2018/0080202 A1 Mar. 22, 2018

(30) Foreign Application Priority Data

Sep. 19, 2016 (CN) .......................... 2016 1 0829629

(51) Int. Cl.
*E03B 3/02* (2006.01)
*E03B 3/28* (2006.01)
*E02B 3/02* (2006.01)
*E01C 11/22* (2006.01)
*E03F 1/00* (2006.01)
*E01C 9/00* (2006.01)

(52) U.S. Cl.
CPC ................ *E03B 3/28* (2013.01); *E01C 9/001* (2013.01); *E01C 9/002* (2013.01); *E01C 9/004* (2013.01); *E01C 11/225* (2013.01); *E01C 11/226* (2013.01); *E02B 3/02* (2013.01); *E03F 1/002* (2013.01); *E03F 1/005* (2013.01); *Y02A 20/108* (2018.01)

(58) Field of Classification Search
CPC ..... E03B 3/04; E03B 3/06; E03B 3/28; E03B 3/40

USPC ................................................ 405/50, 53, 56
See application file for complete search history.

(56) References Cited

U.S. PATENT DOCUMENTS 5,788,407 A * 8/1998 Hwang ................... C04B 28/02
404/81
5,810,510 A * 9/1998 Urriola ................. E02B 11/005
137/236.1
5,848,856 A * 12/1998 Bohnhoff ................ E02B 11/00
405/36

(Continued)

FOREIGN PATENT DOCUMENTS

JP 2006022502 A * 1/2006

*Primary Examiner* — Frederick L Lagman
(74) *Attorney, Agent, or Firm* — Leong C. Lei

(57) ABSTRACT

A water generation system for deserts is provided as a water generation system designed for desert climate areas and constructed in a surface pavement and generally includes a sand layer, which includes a water tank embedded therein and is covered with a moisture locking cloth on which a grading layer is laid. A water resisting cloth is arranged in the grading layer. Hollow water penetration tubes are arranged above the grading layer and have bottoms extending through the water resisting cloth and inserted into the grading layer with pouring and grouting of grout cement thereon to form a water pervious layer. As such, rainwater can be quickly conducted into the sand layer for storage for subsequent uses and air can be conducted into the grading layer to subject to condensation for forming condensed water on an undersurface of the water resisting cloth to achieve a purpose of automatic water generation.

9 Claims, 9 Drawing Sheets

(56) References Cited

U.S. PATENT DOCUMENTS

| | | | |
|---|---|---|---|
| 6,585,449 B2 * | 7/2003 | Chen | E01C 11/18 404/2 |
| 6,779,946 B1 * | 8/2004 | Urriola | E01C 9/004 405/43 |
| 7,198,432 B2 * | 4/2007 | Chen | E03F 1/002 405/36 |
| 7,290,958 B2 * | 11/2007 | Blackwood | E01C 13/02 405/43 |
| 7,351,004 B2 * | 4/2008 | Shaw | E01C 11/226 404/17 |
| 7,686,540 B2 * | 3/2010 | Urriola | E01C 11/225 405/43 |
| 8,142,101 B2 * | 3/2012 | Kaul | E01C 7/085 404/31 |
| 8,267,618 B2 * | 9/2012 | Chen | E01C 3/003 404/17 |
| 8,388,260 B2 * | 3/2013 | Chen | E01C 3/00 404/17 |
| 8,740,496 B2 * | 6/2014 | Allen | E01C 11/18 403/364 |
| 9,303,365 B2 * | 4/2016 | Gooden | A01G 13/0237 |
| 9,938,697 B1 * | 4/2018 | Chen | E03B 3/28 |
| 2006/0115328 A1 * | 6/2006 | Smyers, Jr. | A01G 25/06 405/50 |
| 2007/0031192 A1 * | 2/2007 | Murfin | E03F 1/002 405/43 |
| 2010/0150654 A1 * | 6/2010 | Shaw | E01C 11/18 405/50 |
| 2010/0272514 A1 * | 10/2010 | Hart | E01C 3/06 405/55 |
| 2011/0174706 A1 * | 7/2011 | Russell | A01G 25/00 210/170.01 |
| 2011/0233121 A1 * | 9/2011 | Liu | E03F 5/0404 210/165 |
| 2012/0329934 A1 * | 12/2012 | Bower | C03C 12/00 524/425 |

\* cited by examiner

WATER GENERATION SYSTEM FOR DESERTS

(a) TECHNICAL FIELD OF THE INVENTION

The present invention relates to a water generation system for deserts that is constructed on surface pavement, and more particular to a pavement structure design that provides an effect of automatic water generation through condensation and is particularly applicable to tropic desert climate areas where a significant temperature difference exists between daytime and nighttime and only very few rainfall is present.

(b) DESCRIPTION OF THE PRIOR ART

The Earth has a surface of which 71% is covered by water. However, only 2.5% of the total amount of water is fresh water and the amount of fresh water that is conveniently accessible and is widely used by human beings is less than 1%. With the development of industry and the significant increase of human population, the demand of human being for fresh water is relatively increased. This, together with the damage to the ecology and pollution of the environment, makes water resources a vital global issue. In many areas of the world, the demand for water has already exceeded the level affordable by the water resources. Major water shortage crisis may occur if no action has been taken and this would lead to a major catastrophe. No harvest of crops may be possible and the ecologic system would break down. Issues concerning diseases and poverty would get much worse. The most important issue of this moment is to careful use and treasure the water resources, as well as development and proper use of natural water resources. Collaborative projects for water resources constructions of sustainable development are now an action to be taken immediately.

Different areas are facing different issues and problems of water resources. For example, in tropic desert areas, where annular rainfall or precipitation may be extremely small or even no rainfall at all for years; the temperature difference between daytime and nighttime is great; sun light is intense in daytime; temperature is extremely high and humidity is low; and winds are generally strong, water gets quickly vaporized and flying away from the soil, making such areas constantly in a water deficient condition. This makes the development of water resources very important.

In view of the above, the present invention aims to provide, in consideration of the needs of desert areas and using the unique weather characteristic of such areas where the temperature difference between daytime and nighttime is great, a water generation system that is particularly applicable to such areas.

SUMMARY OF THE INVENTION

Thus, the primary object of the present invention is to provides a water generation system for deserts, which is constructed on surface pavement to allow rainwater to quickly penetrate downward for accumulation and storage and to achieve a purpose of automatic generation of water for subsequent uses through condensation without consumption of electrical power.

To achieve the above object, the present invention provides a water generation system for deserts, which comprises a laid layer used in combination with a water pervious layer through laying from bottom to top. The laid layer comprises a sand layer and a grading layer. The laid layer, which is used in combination with a water pervious layer, is solely formed of a sand layer or a grading layer, in combination with the water pervious layer through laying from bottom to top, or alternatively, the laid layer is formed of both a sand layer a grading layer, in combination with a water pervious layer, through laying sequentially from bottom to top.

In such a system, a water tank is selectively embedded, in advance, under the sand layer or the grading layer. The water tank is provided thereon with a plurality of through holes that are covered with a nonwoven fabric material. Further, a moisture locking cloth is provided under the water pervious layer to provide an effect of preventing evaporation and escape of water from the ground layer. The laid layer comprises a water resisting cloth embedded therein and the water resisting layer is laid above the moisture locking cloth. The water pervious layer comprises a plurality of hollow water penetration tubes that are vertically arranged and distributed above the grading layer. Bottoms of the water penetration tubes directly extend through the water resisting cloth in the grading layer to be inserted into and buried in the grading layer. Cement grout is poured and grouted around circumferences of the plurality of water penetration tubes to form a water pervious layer exhibiting an effect of water drainage. As such, when rain falls on the surface, the water penetration tubes allow the rainwater to quickly penetrate into the underground to be accumulated and stored in the water tank for subsequent uses. Further, the unique climate characteristic of having a temperature difference between daytime and nighttime is used such that the cold air of the nighttime is conducted through the water penetration tubes to a site under the water resisting cloth of the laid layer to get condensed, through an effect of condensation, onto condensed water on the undersurface of the water resisting cloth thereby achieving an effect of automatic water generation through condensation without consumption of electrical power. Further, the water formed through condensation is allowed to penetrate down into the underground water tank for accumulation and storage for subsequent uses.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
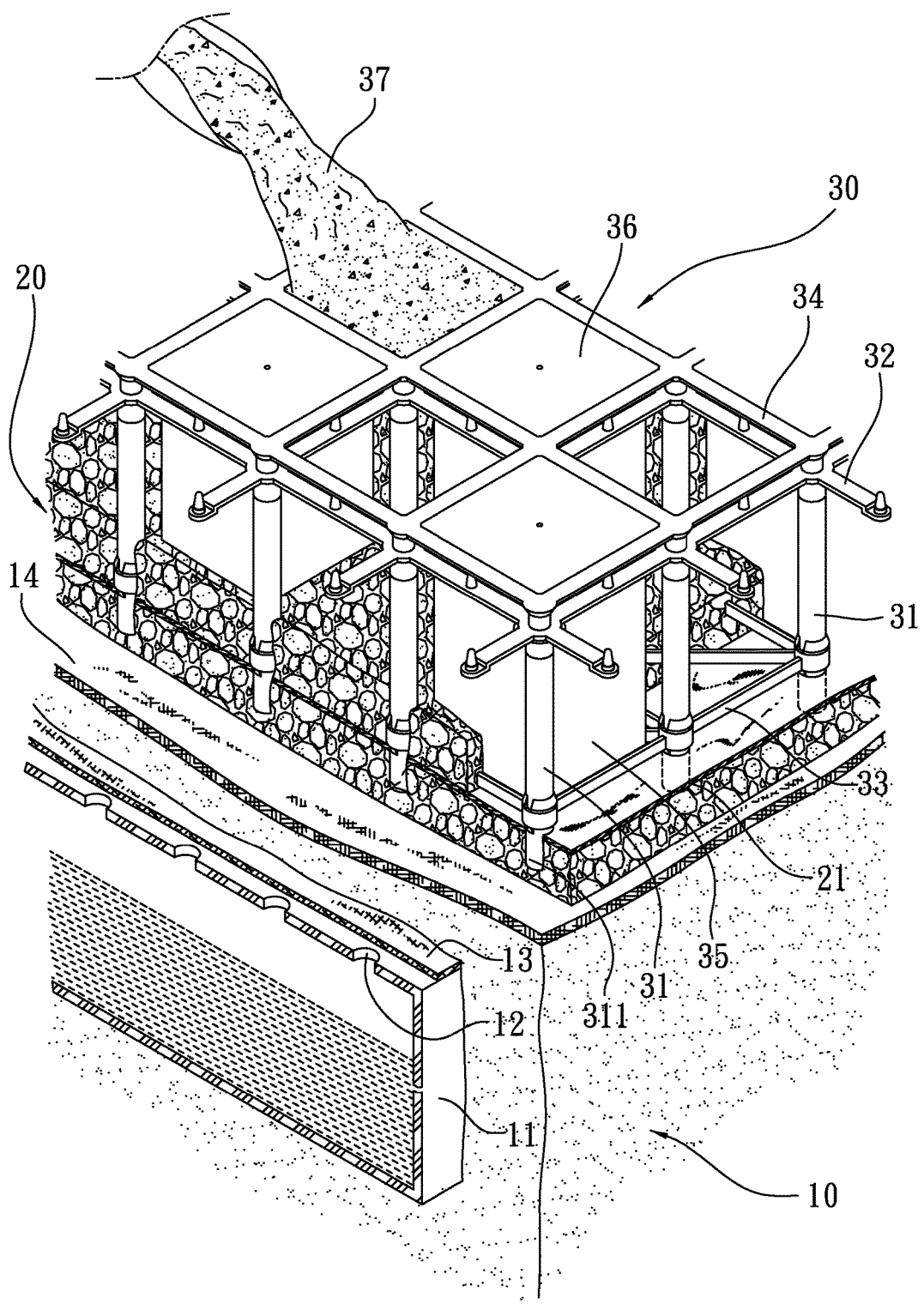
FIG. 1 is a schematic view showing a water generation system for deserts according to the present invention.
Figure 2:
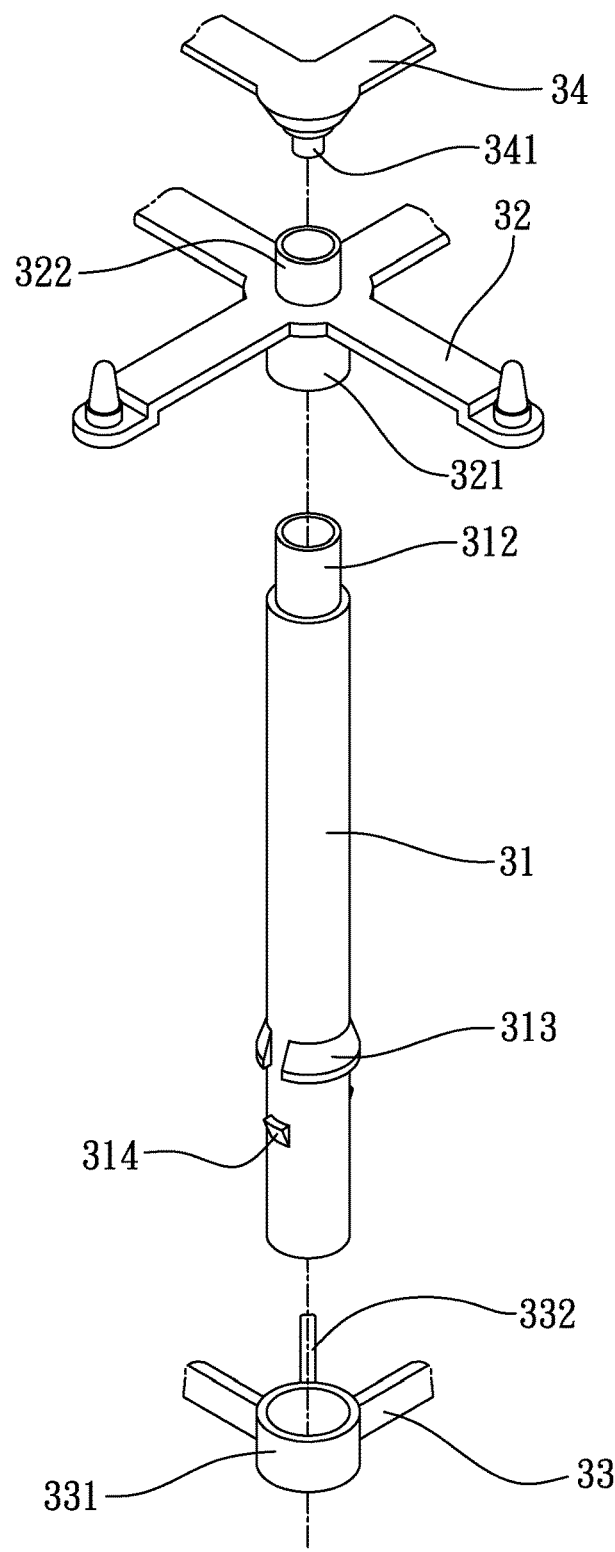
FIG. 2 is an exploded view showing a frame structure of a water pervious layer according to the present invention.
Figure 3:
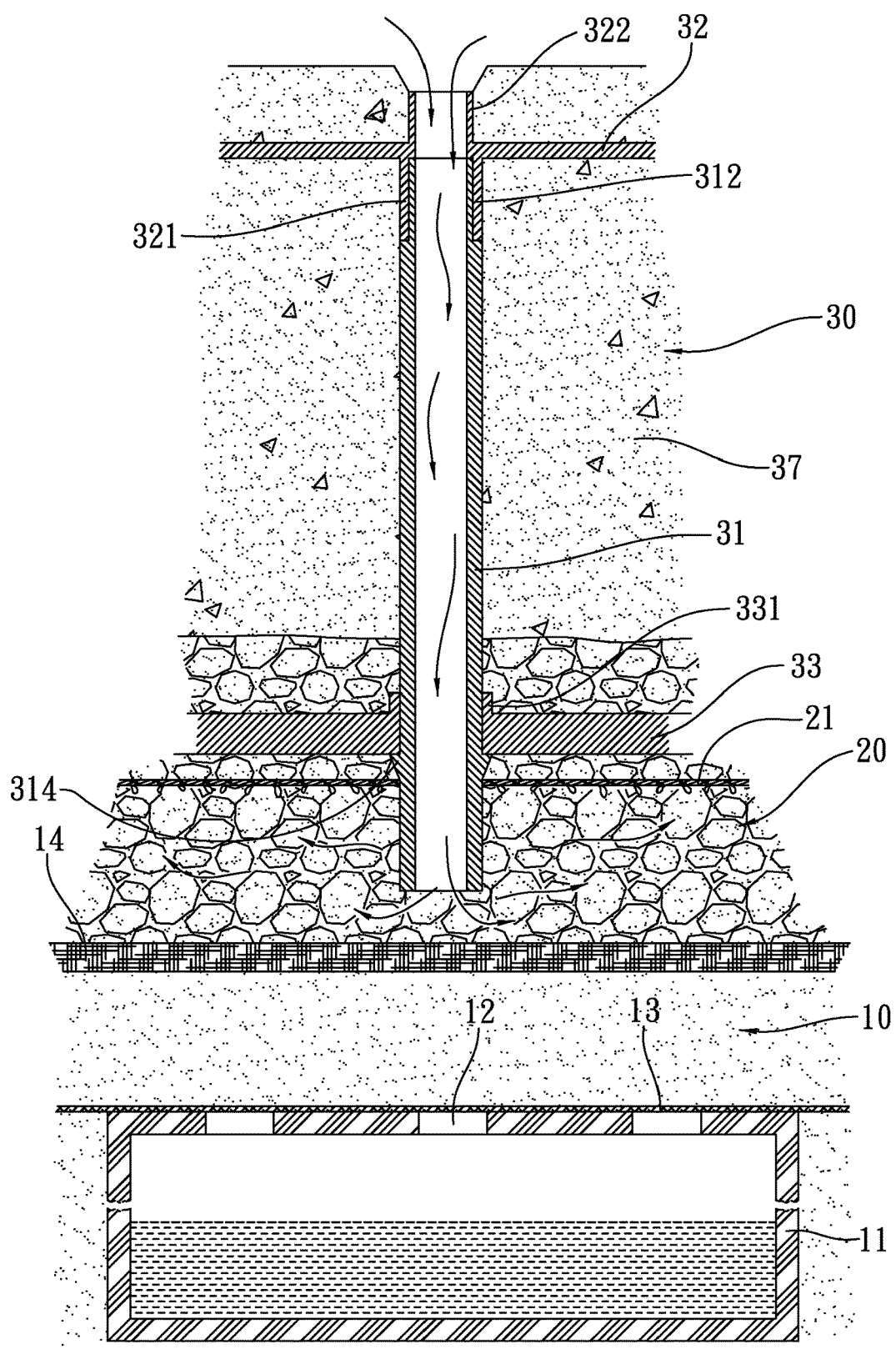
FIG. 3 is a cross-sectional view showing the water generation system for deserts according to the present invention.

Referring to FIGS. 1-3, the present invention provides a water generation system for deserts, which is constructed on a ground surface as a water pervious pavement structure, which is formed of laid layers, in combination with a water pervious layer, laid from bottom to top, and including a structure that is constructed on the ground surface to form a water pervious pavement. In the embodiment illustrated in the drawings, the water generation system comprises, from bottom to top, laid layers that include a sand layer 10 and a grading layer 20, in combination with a water pervious layer 30.

The sand layer 10 may comprises a water tank 11 that is embedded therein during laying. The water tank 11 is provided, in a top thereof, with a plurality of through holes 12, and a sand blocking member, such as a piece of nonwoven fabric 13, is arranged atop and covers the through holes 12 in order to block sands and allow rainwater or condensed water to penetrate into the underside water tank 11 for accumulation and storage for subsequent uses. The sand layer 10 is covered with a moisture locking cloth 14. The moisture locking cloth 14 provides an effect of preventing reverse flow of moisture so that when moisture or water flows down into the sand layer 10 under the moisture locking cloth 14, the moisture or water can be held in the ground layers to prevent the moisture or water from evaporating away upwards.

The grading layer 20 comprises a water resisting cloth 21 embedded therein and laid above the moisture locking cloth 14 of the sand layer 10 such that the water resisting cloth 21 and the moisture locking cloth 14 are spaced from each other by soil or earth of the grading layer 20 interposed therebetween. The grading layer 20 can be formed of local soil or earth or grading materials for general road construction including sand or soil, or gravel, which may additionally mixed with water pervious concrete, or may be mixed with other grade materials that are not harmful to the environments and may serve as pavement.

The water pervious layer 30 comprises a water pervious pavement structure, which comprises a plurality of hollow water penetration tubes 31 arranged vertically and set above the grading layer 20. Bottoms of the water penetration tubes 31 directly extend through the water resisting cloth 21 of the grading layer 20 such that opening sections formed in the bottoms of the water penetration tubes 31 are buried and embedded in the portion of the grading layer 20 under the water resisting cloth 21. A space around outer circumferences of the plurality of hollow water penetration tubes 31 receives pouring or grouting of cement grouting 37 to form the water pervious layer 30 that exhibits an effect of water drainage.

Further, in the instant preferred embodiment, the water penetration tubes 31 are combined together with an upper connection sub-frame 32 and a lower connection sub-frame 33 to form a frame structure that is laid and arranged above the grading layer 20. Top ends of the water penetration tubes 31 may be provided with and covered by a capping form 34 that corresponds to the positions of the tubes and after pouring and shaping of the cement grout 37, the capping form 34 can be removed. The water penetration tubes 31 are each provided in an upper end portion of a tubular body thereof with a stepped section 312 that is inward reduced, and are also provided with a retention ring 313 and a slope tenon 314 at locations close to bottom ends thereof. The upper connection sub-frame 32 and the lower connection sub-frame 33 are each a framework comprising a plurality of hollowed cavities surrounded by a flange section. A plurality of fitting rings 321 is provided on an underside of a plate section of the upper connection sub-frame 32, which serves as the flange section that surrounds circumferences of the hollowed cavities, to receive the stepped sections 312 of the water penetration tubes 31 to fit therein. Each of the fitting rings 321 is provided, on a top thereof, with a short tube 322 that is hollowed therethrough. To prevent the cement grout 37 from filling into and blocking the water penetration tubes 31 during a pouring or grouting process, a plurality of plugs 341 that is tightly engageable with an inner circumference of the short tubes 322 is provided on an underside of the capping form 34. Further, the lower connection sub-frame 33 comprises annular bodies 331 formed on the flange section and corresponding to and distributed along the circumference of each of the hollowed cavities to receive a bottom end portion of the water penetration tubes 31 to be received therein and engage with and be retained with the retention ring 313 and the slope tenon 314 so as to prevent sliding or undesired movement during the grouting process of the cement grout 37. Further, the lower connection sub-frame 33 is provided with ribs 332 formed in the hollow cavities thereof for structural strengthening.

The water generation system for deserts according to the present invention can be solely constructed with the sand layer described above, in combination with the above-described water pervious layer through laying from bottom to top, or can also be solely constructed with the grading layer described above, in combination with the above-described water pervious layer through laying from bottom to top. It is believed all these various modified embodiments fall within the scope of the claims of the present invention. In the structure involving only the sand layer or only the grading layer, in combination with the water pervious layer to form the present invention, the sand layer or the grading layer can be provided with a water tank 11 that is embedded therein in advance and the water tank 11 is provided, on the top thereof, with a plurality of through holes 12 with a sand blocking member, such as a piece of nonwoven fabric 13, being arranged atop and covering each of the through holes 12 in order to block sands and allow rainwater or condensed water to penetrate into the underside water tank 11 for accumulation and storage for subsequent uses.

Figure 2A:
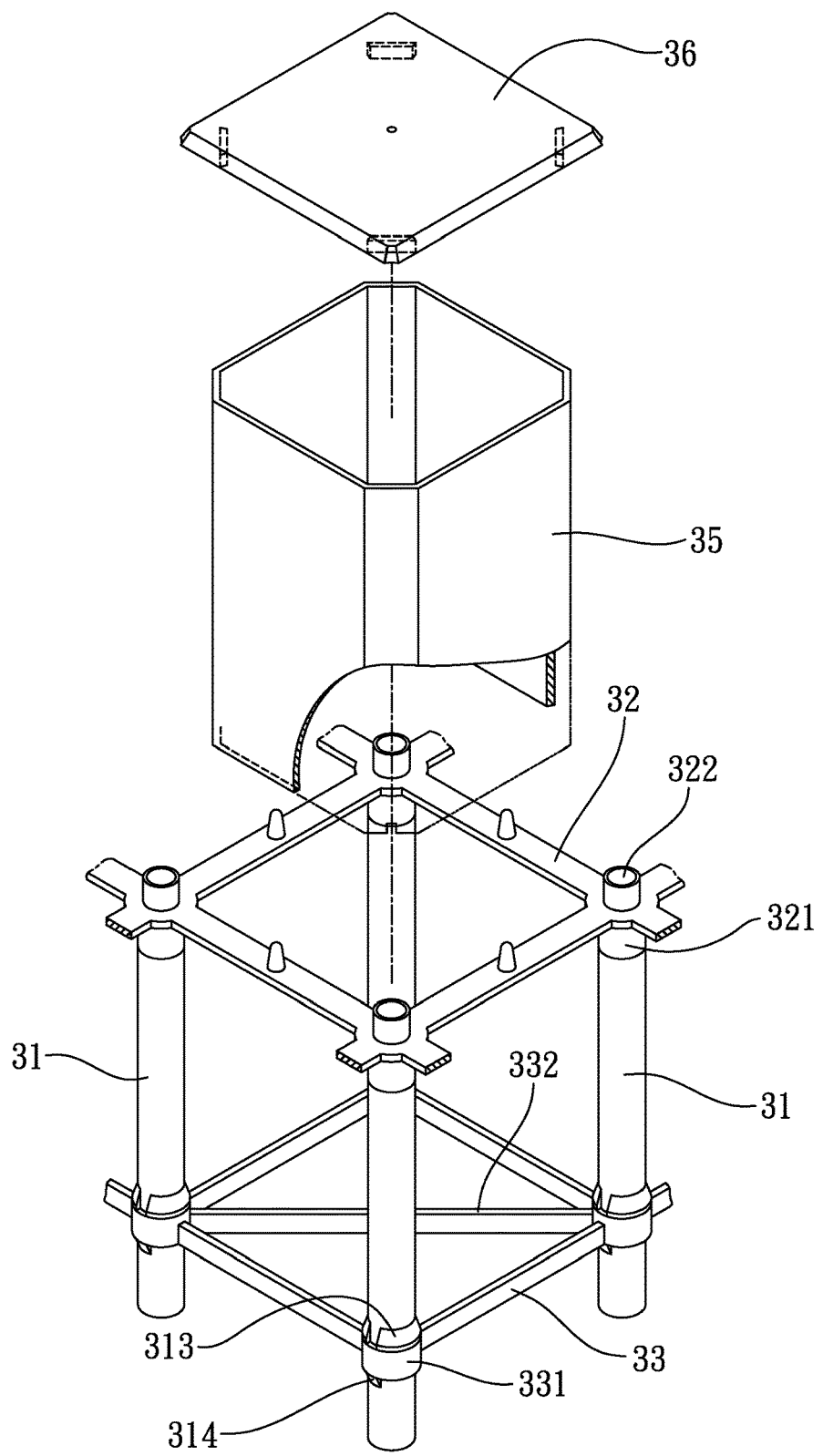
FIG. 2a is a schematic view illustrating installation of a grass cultivation box in the water pervious layer according to the present invention.
Figure 4:
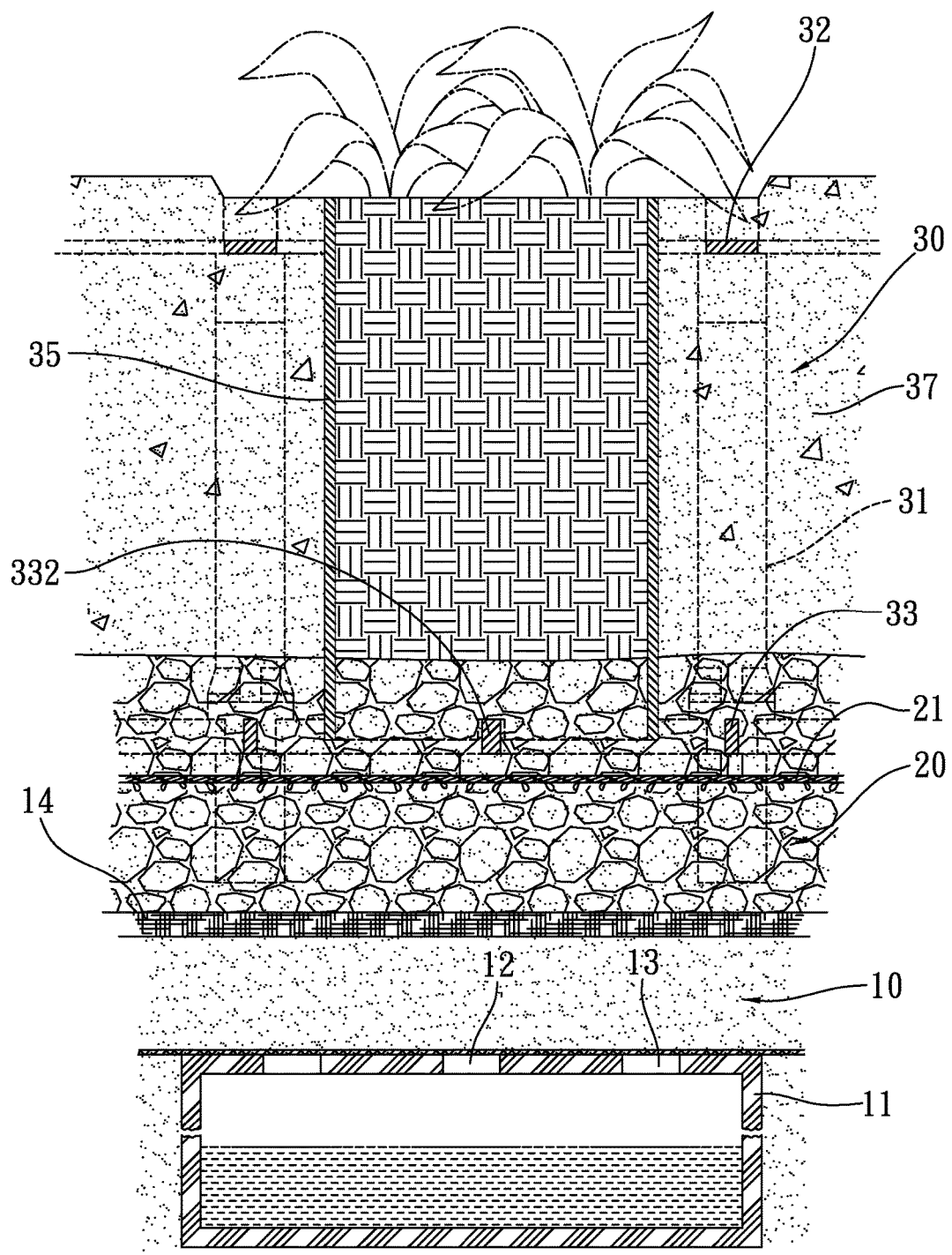
FIG. 4 is another cross-sectional view showing the water generation system for deserts according to the present invention.
Figure 5:
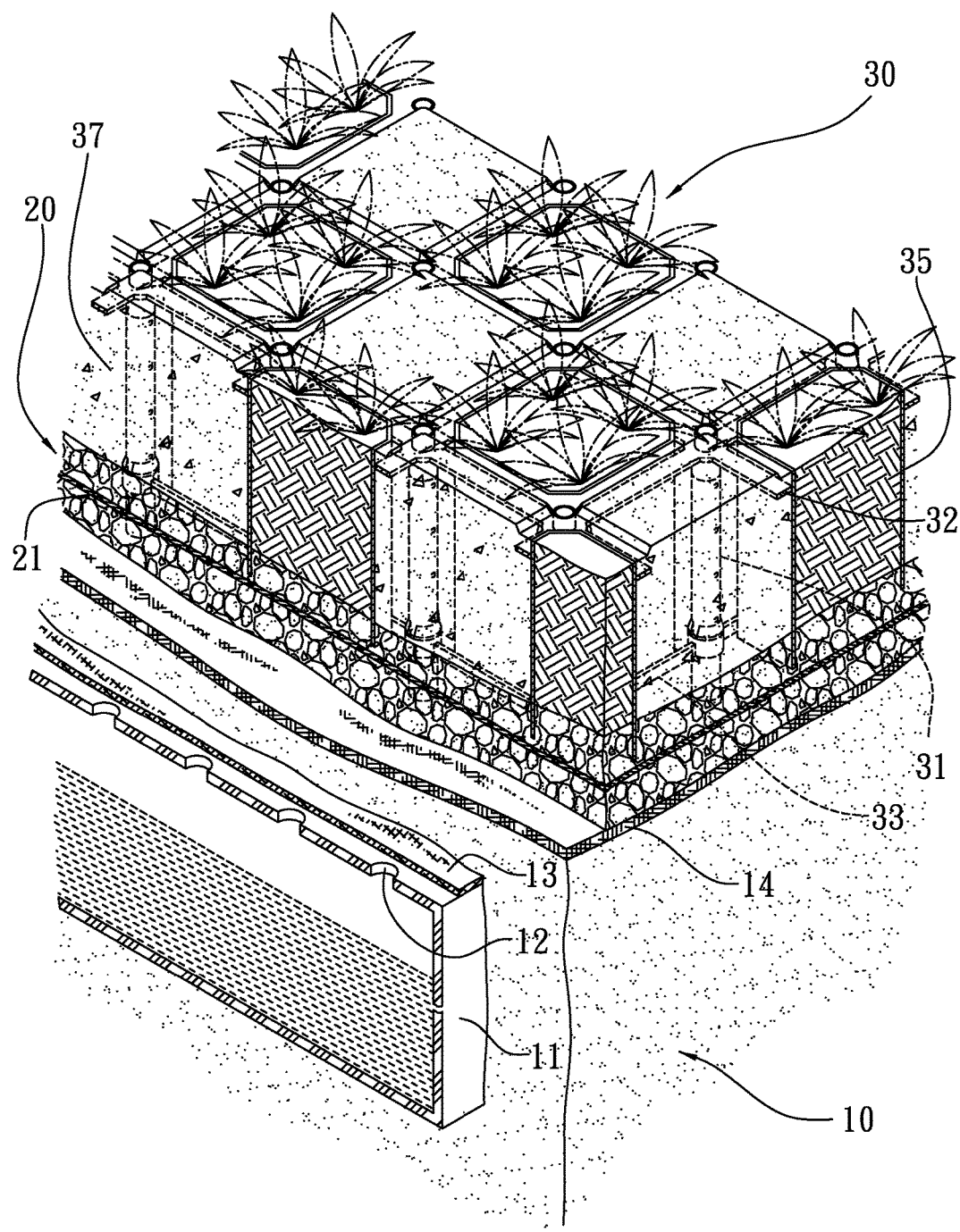
FIG. 5 is a schematic view illustrating an example of application of the water generation system for deserts according to the present invention.

Referring to FIGS. 2a, 4, and 5, the present invention may further comprise a hollowed grass cultivation box 35 arranged in the hollowed cavities of the upper connection sub-frame 32 and the lower connection sub-frame 33 and the grass cultivation box 35 is provided atop with a box cover 36 corresponding to and arranged in the capping form 34 so that after grouting and shaping of the cement grout 37 is completed, the capping form 34 can be removed together with the box cover 36 to expose the grass cultivation box 35 for selectively filling and disposing soil and earth therein (for grass cultivation boxes having relatively large sizes) for cultivation of grass for greening purposes so as to thus complete the construction of the water pervious layer 30. If the grass cultivation box 35 used is of a relatively small size and does not causes interference with treading of human feet or rolling of vehicle wheels, then it may not be necessary to fill soil and earth in the grass cultivation box 35, for external dusts may directly fly into and get deposited in the grass cultivation box to allow plants to naturally grow in the grass cultivation box 35, this also reaching an effect of greening.

As such, when the rainfalls on the surface are great and intense, the rainwater can be quickly conducted through the water penetration tubes 31, which serves a surface pavement, into the underside grading layer 20 to further penetrate into the sand layer 10 that is located at a further deeper location to get into the water tank 11 for accumulation and storage for environmentally friendly regeneration and subsequent uses. This provides an effect way of collection of water resources and allowing for fast and efficient draining of surface water, reducing accumulation of water on the surface an also helping supplement underground moisture and water to keep ground and soil wet for helping supply ground fertilization to the plants growing in the grass cultivation box 35.

Further, the water generation system for deserts according to the present invention makes a general use of the desert climate characteristic that a significant temperature difference is present between daytime and nighttime such that in the nighttime, the ground surface that has been exposed to sun light and at a high temperature during daytime to generate a temperature difference of a temperature of the laid layers under the water pervious pavement structure of the water pervious layer 30 from the outside temperature, such as being higher or lower than the surface temperature of the outside, and thus, the water penetration tubes 31 may conduct, naturally, cold air down into a location below the water resisting cloth 21 of the grading layer 20 such that water contained in atmosphere can be extracted through condensation by being condensed on an undersurface of the water resisting cloth 21 to form condensed water, achieving an effect of automatic water generation through condensation.

If the present invention is constructed solely with the sand layer 10 in combination with the water pervious layer 30 through being laid from bottom to top, or if the present invention is constructed solely with the grading layer 20 in combination with the water pervious layer 30 through being laid from bottom to top, the bottoms of the water penetration tubes 31 can be directly penetrate through the water resisting cloth 21 embedded in the sand layer or the grading layer such that open sections formed in the bottoms of the water penetration tubes 31 are buried and embedded in the portion of the sand layer or the grading layer under the water resisting cloth 21, similarly allowing for condensation of water on the undersurface of the water resisting cloth 21 in an automatic manner and thus achieving an effect of water generation without consumption of energy.

Figure 6:
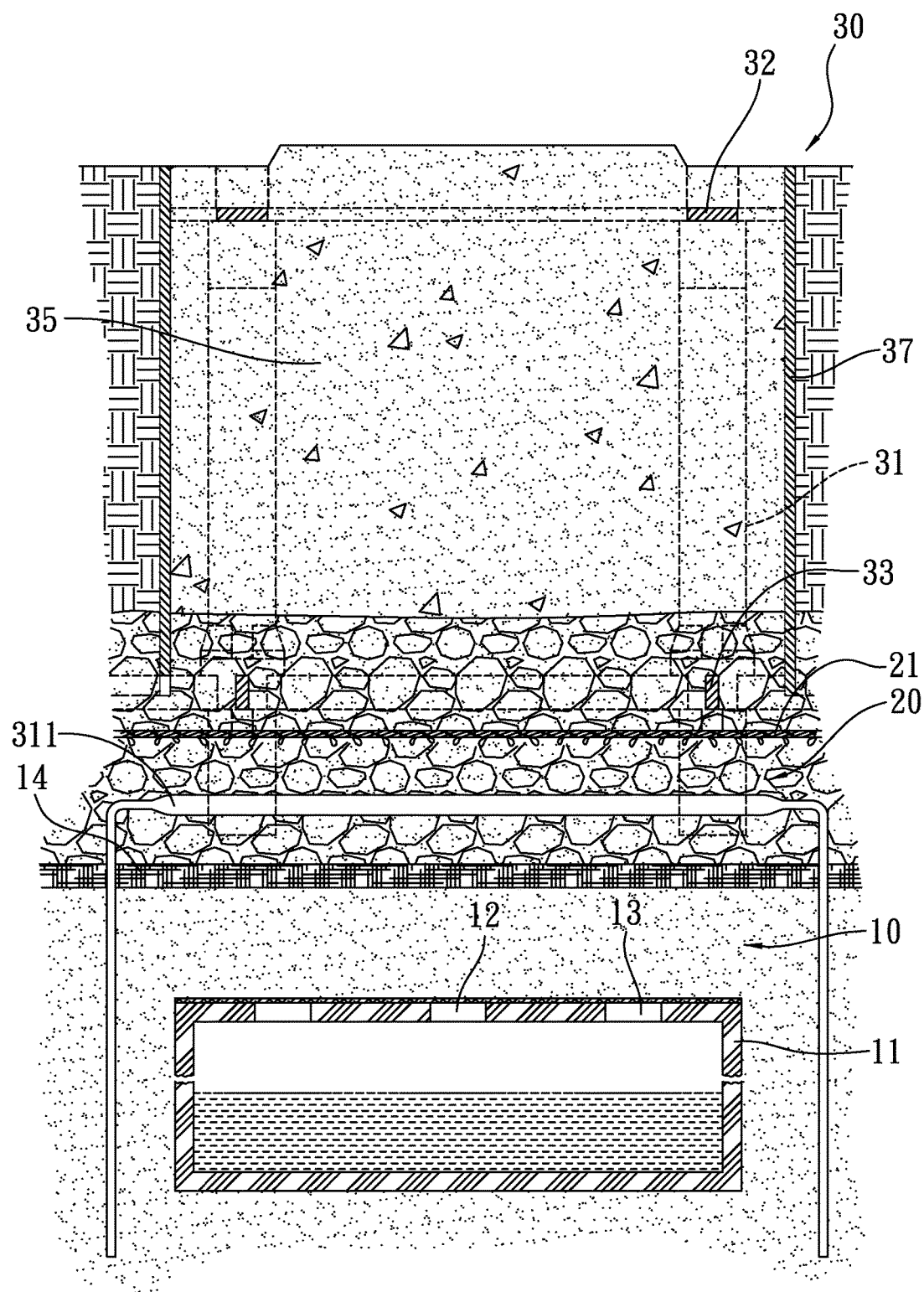
FIG. 6 is a schematic view illustrating an example of application of the present invention in which a heat conduction pipe is additionally provided in an underground soil layer.

Referring to FIG. 6, as shown in the drawing, the present invention may further comprise a heat conduction pipe 311 (also known as heat pipe) located under the water resisting cloth 21 and above the moisture locking cloth 14. The heat conduction pipe is a hollow metal tube comprising a unique material exhibiting a characteristic of fast temperature homogenization so as to show a characteristic of light weight, and the characteristic of fast temperature homogenization is achieved with the performance of superior thermal super conductivity thereof. The heat conduction pipe 311 is arranged in a laid layer between under the water resisting cloth 21 and the moisture locking cloth 14 and the laid layer can be solely formed of the sand layer or solely formed of the grading layer with extension legs of the heat conduction pipe 311 extending through the moisture locking cloth 14 and penetrating deeply into the underground soil at a deeper site to achieve an effect of naturally conducting the underground temperature upward to play a role of fast temperature/heat transmission so that in a desert where the atmosphere temperature significantly lowers during the nighttime, the heat conduction pipe 311 may conduct a "relatively high" ground temperature of the underground site to the top, or when the atmosphere temperature of the desert is high and hot during daytime, the heat conduction pipe 311 may conduct a "relatively low" ground temperature of the underground site to the top, whereby temperature difference in the laid layer at between under the water resisting cloth 21 and the moisture locking cloth 14 is made more significant to achieve more efficient result of water generation through condensation induce by temperature difference.

Figures 7, 7A:
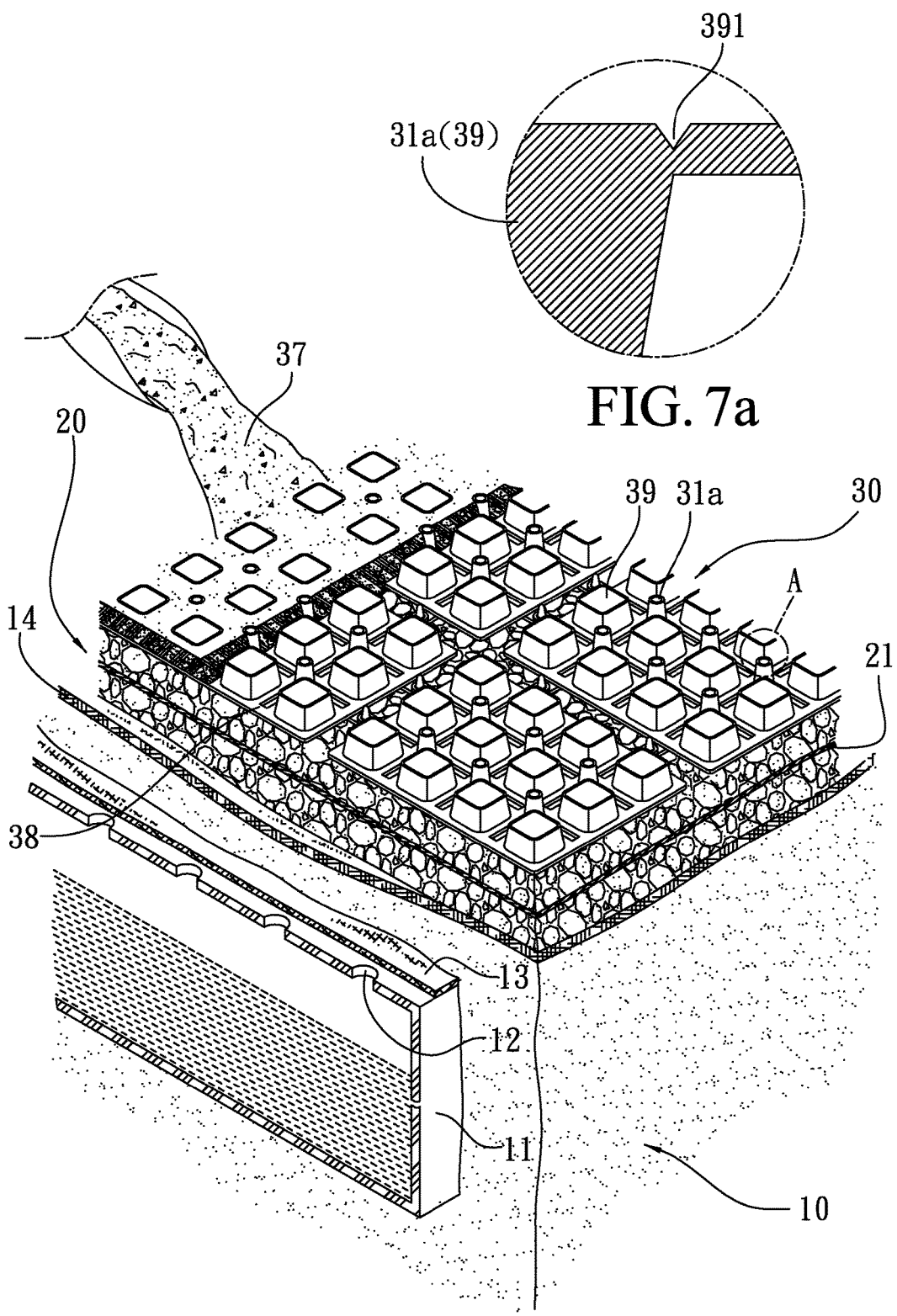
FIG. 7 is a schematic view illustrating another embodiment of the water pervious layer according to the present invention.
FIG. 7a is an enlarged view of a portion of the embodiment illustrated in FIG. 7.
Figure 8:
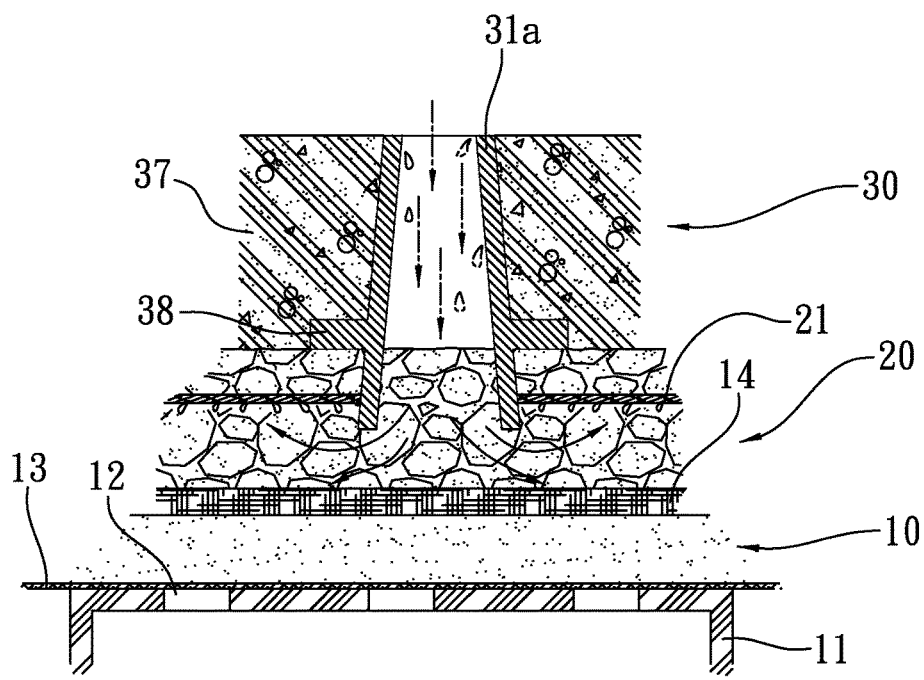
FIG. 8 is a cross-sectional view of the embodiment of FIG. 7.
Figure 9:
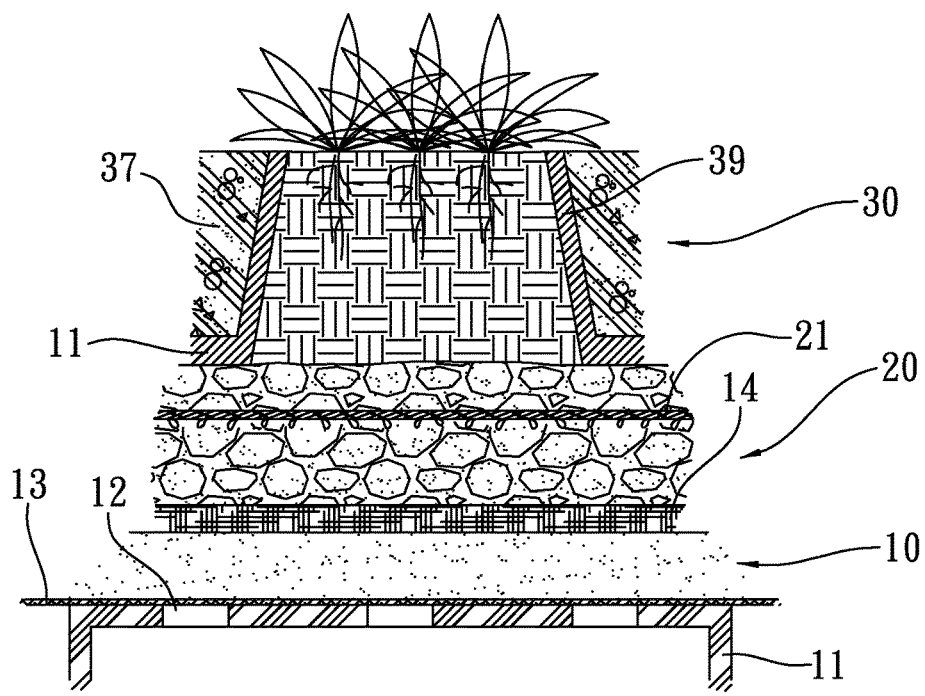
FIG. 9 is another cross-sectional view of the embodiment of FIG. 7.

Referring to FIGS. 7-9, a water generation system for deserts according to another embodiment of the present invention is shown, also comprising laid layers in combination with a water pervious layer through laying from bottom to top and the laid layers comprise, from bottom to top, a sand layer 10 and a grading layer 20, in combination with a water pervious layer 30. In an embodiment, the laid layer can be formed solely of the sand layer, or formed solely of the grading layer, with similar laying from bottom to top to provide a sand layer 10 in combination with a water pervious layer 30 or a grading layer 20 in combination with a water pervious layer 30.

The instant embodiment generally comprises a frame structure included in the water pervious layer 30. The frame structure may be solely provided with water penetration tubes 31a or solely provided with boxes 39, or provided with both the water penetration tubes 31a and the boxes 39. The water penetration tubes 31a have a top that is closed and are directly mounted on a bottom plate 38 in a manner of being spaced from each other by a proper interval. The water penetration tubes 31a each have a tubular body having a bottom extending downward through the bottom plate 38. The bottom plate 38 is provided thereon with a plurality of boxes 39 that have openings facing downward arranged besides the tubular bodies. The water penetration tubes 31a and the boxes 39 each have a top board in which a breaking structure is formed so as to construct a frame structure that is laid above the grading layer 20 with bottom openings of the water penetration tubes directly penetrating through and buried and embedded under the water resisting cloth 21, or the bottom openings of the water penetration tubes may be arranged above the water resisting cloth 21 (this being not shown in the drawings). Pouring or grouting of cement grout 37 is then made on the frame structure and after the completion of the pouring and grouting of the cement grout 37, the breaking structures provided in the tops are broken to thereby form a water pervious layer 30 exhibiting effects of water draining (as shown in FIG. 8) and in-box grass cultivation (as shown in FIG. 9).

As such, rainwater can be quickly conducted through the water penetration tubes 31a to a deep underground site to get into the water tank 11 for accumulation and storage for subsequent uses as environment protection. This provides an effect way of collection of water resources and also helping supplement underground moisture and water to keep ground and soil inside the boxes 39 wet for helping supply ground fertilization to the plants growth.

Further, the breaking structure of the frame structure as discussed above has a configuration that allows the closed top thereof to be easily broken with simple hand tools to form an open condition (as shown in FIGS. 8 and 9). Such as breaking structure can be formed by making a thin leaf like structure in the top board so as to be easily broken through secondary processing, or can be formed as a loop-like recessed groove 391 (as shown in FIG. 7a) in the top side of the board so that the top board can be removed through breaking by applying a force thereto. Further, the recessed groove 391 can be formed in an undersurface of the top board, namely at an interface between an inside wall of the water penetration tube 31a or the box 39, this providing a similar effect.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A water generation system for deserts, which is formed of an artificial surface pavement, wherein a laid layer is used in combination with a water pervious layer through laying from bottom to top, the laid layer comprising a sand layer, wherein
   the sand layer, which is covered with a moisture locking cloth for preventing water evaporation and escape;
   a water resisting cloth, which is laid above the moisture locking cloth and located under the water pervious layer;
   the water pervious layer, which comprises a plurality of hollow water penetration tubes arranged above the sand layer, the water penetration tubes having bottoms directly extending through the water resisting cloth and set in a manner of being vertically inserted into and buried in the sand layer, cement grout being provided around circumferences of the plurality of hollow water penetration tubes to form a water pervious layer exhibiting an effect of water drainage;
   wherein rainwater is allowed to penetrate to bottom layer and air is directly conducted into a laid layer under the water resisting cloth to allow for condensation of water on an undersurface of the water resisting cloth through condensation to form condensed water and thus achieving an effect of automatic water generation;
   wherein a heat conduction pipe is provided between under the water resisting cloth and above the moisture locking cloth, the heat conduction pipe having extension legs extending through the moisture locking cloth and penetrating into soil at an underside to achieve an effect of guiding, in a natural way, underground temperature to the top.

2. The water generation system for deserts according to claim 1, wherein the sand layer comprises a water tank embedded therein in advance and the water tank is provided thereon with a plurality of through holes, the through holes being provided atop with and covered by a sand blocking member, allowing rainwater or condensed water to penetrate down to the underside water tank to be accumulated therein for subsequent uses.

3. The water generation system for deserts according to claim 1, wherein the water pervious layer is of an alternative arrangement that comprises a frame structure and cement grout is poured and grouted around a circumference of the frame structure to form a water pervious layer that exhibits an effect of water draining, the frame structure being provided with water penetration tubes only, or being provided with boxes only, or being provided with both water penetration tubes and boxes.

4. A water generation system for deserts, which is formed of an artificial surface pavement, wherein a laid layer is used in combination with a water pervious layer through laying from bottom to top, the laid layer comprising a grading layer, wherein
   the grading layer, which comprises a moisture locking cloth for preventing water evaporation and escape;
   a water resisting cloth, which is laid above the moisture locking cloth and located under the water pervious layer;
   the water pervious layer, which comprises a plurality of hollow water penetration tubes arranged above the grading layer, the water penetration tubes having bottoms directly extending through the water resisting cloth and set in a manner of being vertically inserted into and buried in the grading layer, cement grout being provided around circumferences of the plurality of hollow water penetration tubes to form a water pervious layer exhibiting an effect of water drainage;
   wherein rainwater is allowed to penetrate to bottom layer and air is directly conducted into a laid layer under the water resisting cloth to allow for condensation of water on an undersurface of the water resisting cloth through condensation to form condensed water and thus achieving an effect of automatic water generation;
   wherein a heat conduction pipe is provided between under the water resisting cloth and above the moisture locking cloth, the heat conduction pipe having extension legs extending through the moisture locking cloth and penetrating into soil at an underside to achieve an effect of guiding, in a natural way, underground temperature to the top.

5. The water generation system for deserts according to claim 4, wherein the grading layer comprises a water tank embedded therein in advance and the water tank is provided thereon with a plurality of through holes, the through holes being provided atop with and covered by a sand blocking member, allowing rainwater or condensed water to penetrate down to the underside water tank to be accumulated therein for subsequent uses.

6. The water generation system for deserts according to claim 4, wherein the water pervious layer is of an alternative arrangement that comprises a frame structure and cement grout is poured and grouted around a circumference of the frame structure to form a water pervious layer that exhibits an effect of water draining, the frame structure being provided with water penetration tubes only, or being provided with boxes only, or being provided with both water penetration tubes and boxes.

7. A water generation system for deserts, which is formed of an artificial surface pavement, wherein a laid layer is used in combination with a water pervious layer through laying from bottom to top, the laid layer comprising a sand layer and a grading layer, wherein the sand layer, which is covered with a moisture locking cloth for preventing water evaporation and escape;

the grading layer, which is laid on the moisture locking cloth of the sand layer, the grading layer comprising a water resisting cloth arranged therein;

the water pervious layer, which comprises a plurality of hollow water penetration tubes arranged above the grading layer, the water penetration tubes having bottoms directly extending through the water resisting cloth arranged in the grading layer and set in a manner of being vertically inserted into and buried in the grading layer, cement grout being provided around circumferences of the plurality of hollow water penetration tubes to form a water pervious layer exhibiting an effect of water drainage;

wherein rainwater is allowed to penetrate to bottom layer and air is directly conducted into a laid layer under the water resisting cloth to allow for condensation of water on an undersurface of the water resisting cloth through condensation to form condensed water and thus achieving an effect of automatic water generation;

wherein a heat conduction pipe is provided between under the water resisting cloth and above the moisture locking cloth, the heat conduction pipe having extension legs extending through the moisture locking cloth and penetrating into soil at an underside to achieve an effect of guiding, in a natural way, underground temperature to the top.

8. The water generation system for deserts according to claim 7, wherein the sand layer comprises a water tank embedded therein in advance and the water tank is provided thereon with a plurality of through holes, the through holes being provided atop with and covered by a sand blocking member, allowing rainwater or condensed water to penetrate down to the underside water tank to be accumulated therein for subsequent uses.

9. The water generation system for deserts according to claim 7, wherein the water pervious layer is of an alternative arrangement that comprises a frame structure and cement grout is poured and grouted around a circumference of the frame structure to form a water pervious layer that exhibits an effect of water draining, the frame structure being provided with water penetration tubes only, or being provided with boxes only, or being provided with both water penetration tubes and boxes.

* * * * *